May 16, 1939.     L. T. SACHTLEBEN     2,158,307
OPTICAL SYSTEM AND METHOD OF ADJUSTMENT THEREOF
Filed Sept. 24, 1936     2 Sheets-Sheet 1
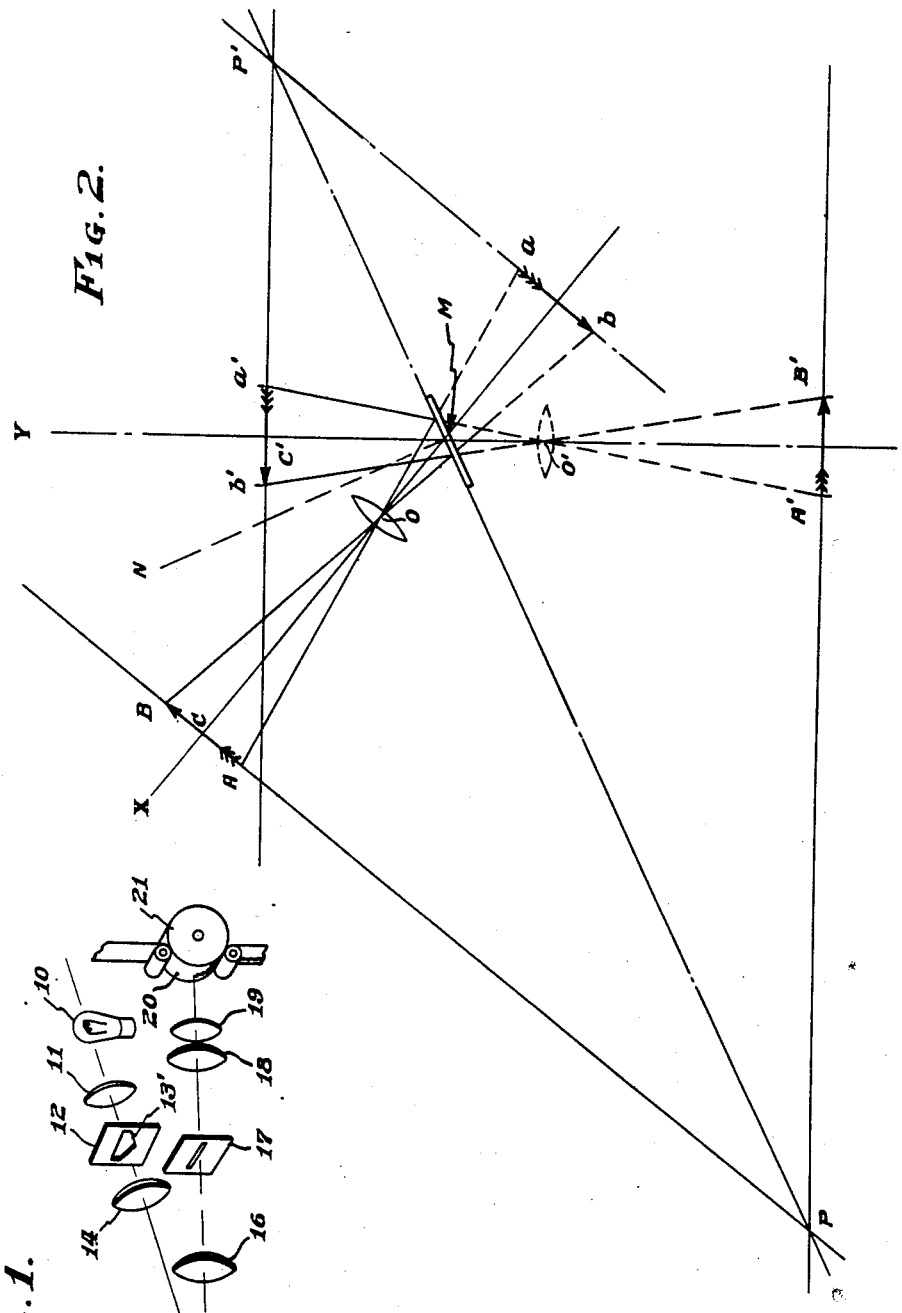
Inventor
Lawrence T. Sachtleben
By
Attorney May 16, 1939.  L. T. SACHTLEBEN  2,158,307
OPTICAL SYSTEM AND METHOD OF ADJUSTMENT THEREOF
Filed Sept. 24, 1936  2 Sheets-Sheet 2
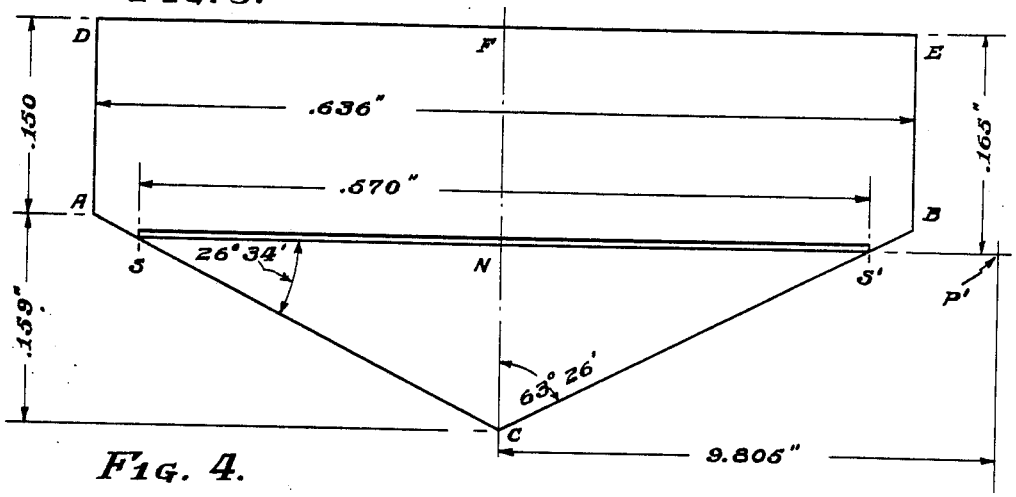
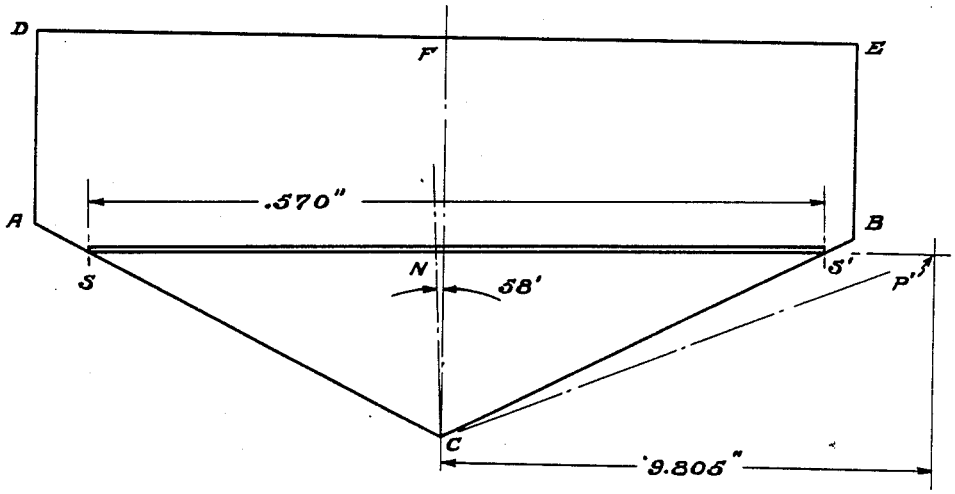
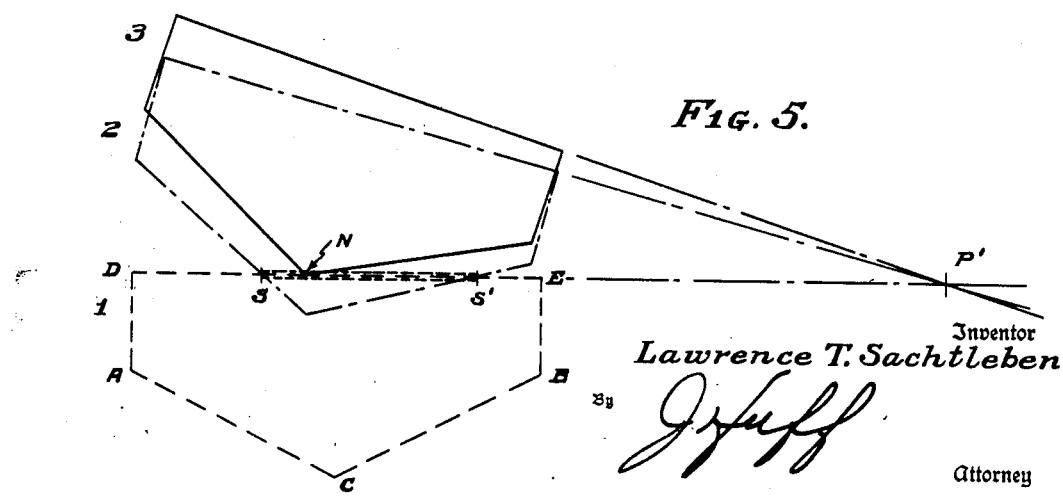
Inventor
Lawrence T. Sachtleben
By
Attorney Patented May 16, 1939

2,158,307

UNITED STATES PATENT OFFICE 2,158,307

OPTICAL SYSTEM AND METHOD OF ADJUSTMENT THEREOF

Lawrence T. Sachtleben, Camden, N. J., assignor to Radio Corporation of America, a corporation of Delaware Application September 24, 1936, Serial No. 102,271

4 Claims. (Cl. 179—100.3)

This invention relates to optical systems for sound recording, and more particularly to the type of optical system wherein a galvanometer is used to move a light spot of triangular shape or other predetermined contour over a narrow slit to modulate the light.

Optical systems of this general type are in extensive commercial use, particularly in connection with what is known as the RCA Photophone System of Sound Recording, wherein a triangular spot of light is moved vertically across a slit so that more or less of the slit is illuminated in accordance with the sound waves, thereby producing a variable area sound record. In moving such a spot of light across a slit, a galvanometer with a small mirror thereon is usually employed, such an apparatus being termed an oscillograph.

The optical system is arranged with the light source and image aperture lying along one of the arms of a V-shaped assembly, and with the slit and objective lens on the other arm of the V, which lies in a horizontal plane. The galvanometer mirror is located at the intersection of these two arms, with its face perpendicular to the bisector of the angle between the two arms of the optical system. The axis of rotation of the galvanometer mirror is in the same plane as the two arms of the V and parallel to the mirror.

I have discovered that in this specific arrangement there are certain errors introduced, due to the geometrical arrangement of the parts, which have not been heretofore recognized or corrected for. These errors result from the fact that the aperture image does not move exactly in a straight line, but instead moves along the surface of a cone, thereby producing departures from linearity which will be hereinafter described. I have determined that by slightly rotating the aperture in relation to the slit, it is possible to practically eliminate the errors otherwise arising from this source.

One object of my invention is to provide an improved optical system.

Another object of my invention is to provide an improved method of adjustment of an optical system for sound recording.

Another object of my invention is to produce a more symmetrical variable area sound track than has heretofore been realized.

Other objects and advantages of my invention will be apparent from the following specification considered in connection with the accompanying drawings, in which:

Figure 1 is a diagrammatic perspective view of the optical elements of a sound recording system;

Fig. 2 is a schematic diagram of the paths of the axial and marginal rays in the system of Fig. 1;

Fig. 3 is a greatly enlarged view of the image of the recording aperture superposed on the slit in the conventional manner;

Fig. 4 is a greatly enlarged view of the image of the recording aperture as superposed on the slit when adjusted in accordance with my invention; and Fig. 5 is a greatly enlarged view showing, much exaggerated, the rotation of the aperture image by movement of the galvanometer mirror.

In the foregoing drawings and in the following specification, the ratios, angles and dimensions given are drawn with particular reference to the RCA Photophone Type PR–23 Optical System as a practical example of the application of the preferred form of my invention to commercial recording practice, the aperture and image dimensions being those in commercial use at the present time. From this example it will be apparent to those skilled in the art how the method of arrangement and adjustment can be applied to an optical system of different dimensions.

As shown in Fig. 1, an exciter lamp 10 is provided, which is supplied with current from an appropriate source. Light from the lamp 10 passes through the lens 11 to the aperture plate 12, thereby brightly illuminating the aperture 13 therein. Light from this aperture 13 is directed by the lens 14 to the galvanometer mirror 15, the lenses 11 and 14 together focusing an image of the filament of the lamp 10 on the mirror 15. The lens 16, in conjunction with the lens 14, focuses an image of the aperture 13 upon the slit in the plate 17. This slit is very narrow, being of the order of .0015 inch in width, and it selects a correspondingly narrow portion of the image of the aperture 13 which is transmitted to the objective lenses 18 and 19. These lenses focus a reduced image of the slit 17 upon the film 20, this reduction being preferably of the order of 6 to 1, thereby producing an image on the film 20 having a width of .00025 inch, and a length determined by the amount of the image of the aperture 13 that is transmitted by the slit.

The film 20 is fed past the recording point by an appropriate drum 21, and the phonographic sound record is impressed thereby by supplying modulated current to the coil on which the galvanometer mirror 15 is mounted, thereby causing the image of the aperture 13 to vibrate in accordance with the sound waves.

Fig. 2 is a schematic representation of that portion of the Photophone Film Recording Optical System including aperture at AB, lens at O, galvanometer mirror at M, and slit at $a'b'$, in the common plane of the intersecting optical axes MX and MY. The light travels in the direction XMY, the lens at O forming a real image $ab$ of the aperture AB, as indicated by the chief rays AO$a$ and BO$b$. From the viewpoint of the mirror at M, the real image $ab$ is a virtual object of which the mirror forms the real image $a'b'$. To look at it another way, the image $a'b'$ is the image of an object which, due to the mirror, is virtually at $A'B'$, being formed by a lens which, also due to the mirror, is virtually at $O'$.

In the Photophone optical system the mirror rotates about an axis $PP'$ displacing the image $a'b'$ in a direction normal to the plane of the figure. The exact motion of the image $a'b'$ is not one of simple translation normal to the plane of the figure, but one of rotation about the point $P'$, at the intersection of the axis of rotation of the mirror with the plane of the image $a'b'$. This is most readily evident from the simple laws of imagery in plane mirrors, which state that object and image are equal in size and equi-distant from the reflecting surface. Rotation of the mirror about the axis $PP'$ can thus be replaced by qualitatively opposite rotation of the object $AB$, and lens at $O$, about the axis $PP'$, in which case the image $a'b'$ will move as if formed by the virtual optical system made up of $A'B'$ and the virtual lens at $O'$, if also rotating about $PP'$ in the sense of the original motion of the mirror. Clearly then the image $a'b'$ will also rotate about $PP'$. If the angle of rotation is very small $a'b'$ will effectively execute coplanar rotation about $P'$ in a direction normal to the figure.

In the optical system illustrated, the distance from the mirror M to the plane of the image $a'b'$ (at the slit) is 2.6305 inches and the angle between $PP'$ and the plane of $a'b'$ is 15° making the distance from $P'$ to the optical axis MY 2.6305 cot 15° or 9.805 inches. With this information and a knowledge of the dimensions of the aperture image and slit the problem is solvable by plane trigonometry.

Fig. 3 represents the image of the bilateral recording aperture as it appears in its ideal relation to the slit. The slit $SS'$ is parallel to the aperture edge $DE$, and its perpendicular bisector passes through the point $C$. Under these conditions if the image moves in pure translation in a direction normal to $SS'$ the ends of the slit will simultaneously intersect the cutting edges $AC$ and $BC$ of the aperture image, and the point $C$ will cross the slit at its exact center. These conditions must be met in the practical case where the motion of the image is not one of pure translation, but of rotation about a point distant 9.805 inches from the center of the slit.

Former practice has called for adjustment of the azimuth of the aperture by tilting the mirror about the axis $PP'$ (Fig. 2) until the edge $DE$ of the aperture lies close to the slit $SS'$, and then rotating the edge $DE$ into parallelism and coincidence with the slit $SS'$ by visual inspection. It is easily seen that upon then raising the image 0.165 inch to the position where the ends of $SS'$ lie on the cutting edges, the image will rotate about the point $P'$ through the angle $$\tan^{-1}\frac{.165}{9.805}=\tan^{-1}.0168=58'$$

When the azimuth is adjusted in this manner, the conditions above stated are not met, as an analysis will show.

Referring to Fig. 4, which indicates the aperture image rotated clockwise with respect to the slit, from the position shown in Fig. 3, and with the cutting edges passing through the ends of the slit $SS'$, the distance $SN$ from the end of the slit to the normal to the slit passing through $C$ may be calculated:

Angle $LCS'N = 26°34' - 58' = 25°36'$

Angle $LSCS' = 2 \times 63°26' = 126°52'$ $$\therefore SC = \frac{.570}{\sin 126°52'} \times \sin 25°36' =$$

$$\frac{.570 \times .432}{.800} = .308 \text{ inch}$$

Angle $LSCN = 63°26' - 58' = 62°28'$

Angle $LSNC = 90°$ $$\therefore SN = \frac{SC}{\sin 90°} \times \sin 62°28' = \frac{.308 \times .887}{1} = .273 \text{ inch}$$

Since the mask image is rotating about the point $P'$, which is collinear with the slit $SS'$, the point $C$ will rise to lie on the slit at some point between $S$ and $N$, separated from $N$ by the distance $P'C - P'N$.

Angle $LCSN = 26°34' + 58' = 27°32'$ $$NC = \frac{SC}{\sin 90°} \times \sin 27°32' = \frac{.308 \times .462}{1} = .1425 \text{ inch}$$

$$P'N = 9.805 \frac{\pm SS'}{2} - SN = 9.805 + .285 - .273 = 9.817$$

$$\text{Angle } NP'C = \tan^{-1}\frac{NC}{P'N} = \tan^{-1}\frac{.1425}{9.817}$$

Log $.1425 = 9.15381 - 10$

Log $9.817 = 0.99198$

Log tan $NP'C = 8.16183 - 10$ $\therefore$ Angle $NP'C = 49'54''$

Log $P'C = \log NC - \log \sin 49'54''$ (since $PC = \frac{Nc}{\sin \text{angle } NP'C}$)

Log $NC = 9.15381 - 10$

Log sin $NP'C = 8.16181 - 10$

Log $P'C = 0.99200$ $P'C = 9.8175''$

This result shows that for all practical purposes the point $C$ will rise to the point $N$ on the slit, as their separation will be only 0.0005 inch.

From the analysis it is seen, by referring to Fig. 5, that when the azimuth adjustment is made as described (Fig. 5, position 1) and the aperture image then adjusted to simultaneously overshoot the slit ends (Fig. 5, position 3) (by rotating the mirror M about an axis through M normal to the plane of Fig. 1) the point $C$ will overshoot the slit not at its center (Fig. 5, position 4) but at a point dividing it in the ratio $$\frac{SN}{SS' - SN} = \frac{.273}{.570 - .273} = \frac{.27}{.297} = \frac{92}{100} = \frac{100}{109}$$

This will produce a sound track in which one of the two constituents of the fully modulated bilateral track will be about 9% greater in amplitude than the other.

A difference in amplitude between the two halves of the bilateral track does not introduce any distortion into the reproduced sound, but wherever the usefulness of the bilateral track may depend upon equality of their amplitude, as in balancing a push-pull reproducer photocell output circuit, this disparity of 9% will give rise to erroneous results. Also when making a sound track with the double vane ground noise reduction shutter this disparity will require a corresponding inequality in shutter vane speeds if the ground noise reduction envelopes are to hear similar relationships to the two portions of the bilateral track. An awkward, unsymmetrical mechanical system would be necessary to accomplish this.

The dissymmetry due to the rotary motion of the aperture image may be eliminaed with practical entirety if the azimuth is so adjusted that the point C (Fig. 3) lies on the perpendicular bisector of the slit when the cutting edges AC and CB pass through the end points S and S' of the slit. Rotation of the mirror to bring the point C to the slit will then displace C from the center of the slit an amount of the order of 0.0005 inch which is negligible. This can be easily done by first aligning the edge DE of Fig. 3, coincident with and parallel to the slit SS', and afterward rotating it in the proper sense through the angle $$\tan^{-1}\frac{NF}{NP'}$$

Referring to Fig. 3, $$NF = CF - \frac{SS'}{2} \cot \frac{1}{2} \text{ angle } ACB$$

where CF refers to the image of the aperture and not the aperture itself.

Referring to Fig. 1 NP' (Fig. 2) $= c'p' = MC'$ tan angle $c'MP'$ $$\therefore \tan^{-1}\frac{NF}{NP'} =$$

$$\tan^{-1}\frac{CF - 1/2 SS' \cot 1/2 \text{ angle } ACB \text{ (Fig. 3)}}{MC' \tan \text{ angle } c'MP' \text{ (Fig. 2)}}$$

This correction angle can be applied automatically if the apertures are designed so that the edge DE of Fig. 3 makes an angle $$90° - \tan^{-1}\frac{NF}{NP'}$$

with CE, in the proper quadrant.

The importance of applying the correction in the proper direction cannot be over emphasized, since its application in the wrong direction will double the errors rather than cancel them. Inasmuch as the apertures may be mounted in the optical system with apex turned either up or down, depending on the design of the system; the correcting may possibly be applied in one direction in one system and oppositely in another. As a general rule, if the base, DE, (Fig. 3) of the aperture itself lies below the apex, C, the correction will be applied by turning the aperture so that its end, EB, which is nearer the slit of the optical system will rise away from the base. Inversion of the aperture will, of course, require the correction to be applied oppositely to this.

Having now described my invention, I claim:

1. The method of adjusting an optical system having a vibrating mirror deflecting an image of an aperture having variable cross section which is projected upon an aperture of uniform cross section in a path which is approximately a conical surface, comprising the step of rotating the said aperture having a variable cross section about the optical axis to the position in which the image of said aperture of variable cross section on said aperture of uniform cross section is at its position of maximum deflection toward minimum exposure of the second aperture symmetrically arranged about the axis of said image perpendicularly bisecting said aperture of uniform cross section.

2. The method of adjusting an optical system having a vibrating mirror deflecting an image of an aperture having variable cross section which is projected upon an aperture of uniform cross section in a path which is approximately a conical surface, comprising the step of rotating the said aperture about the optical axis to the position in which the image of said aperture of variable cross section on said aperture of uniform cross section is at its position of maximum deflection toward maximum exposure of the second aperture symmetrically arranged about the perpendicular bisector of said aperture of uniform cross section.

3. An optical system comprising a light source, an aperture of variable cross section, an aperture of uniform cross section, means for directing an image of said aperture of variable cross section on said aperture of uniform cross section, means movable about an axis lying in the plane defined by the optical axes of said directing means for moving said image in a path which is approximately a conical surface in accordance with impulses to be recorded, means for conveying a record strip through the apparatus and means for focusing light from said second aperture on said record strip, the said two apertures being so arranged that the image of said first aperture on said second aperture is, at its position of maximum deflection toward maximum exposure of the second aperture, symmetrically arranged about its own axis perpendicularly bisecting said second aperture.

4. An optical system comprising a light source, an aperture of variable cross section, an aperture of uniform cross section, means for directing an image of said aperture of variable cross section on said aperture of uniform cross section, means movable about an axis lying in the plane defined by the optical axes of said directing means for moving said image in a path which is approximately a conical surface in accordance with impulses to be recorded, means for conveying a record strip through the apparatus and means for focusing light from said second aperture on said record strip, the said two apertures being so arranged that the image of said first aperture on said second aperture is, at its position of maximum deflection toward maximum exposure of the second aperture, symmetrically arranged about the perpendicular bisector of said second aperture.

LAWRENCE T. SACHTLEBEN.